US012587957B2

(12) United States Patent
Raghavachari et al.

(10) Patent No.: US 12,587,957 B2
(45) Date of Patent: Mar. 24, 2026

(54) METHOD AND SYSTEM FOR CELLULAR PREFERENCE

(71) Applicant: Verizon Patent and Licensing Inc., Basking Ridge, NJ (US)

(72) Inventors: Balaji L. Raghavachari, Bridgewater, NJ (US); Douglas C. Oesterlin, Fort Worth, TX (US); Yong Sang Cho, Old Tappan, NJ (US); Jeremy Nacer, Boca Raton, FL (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 395 days.

(21) Appl. No.: 18/304,544

(22) Filed: Apr. 21, 2023

(65) Prior Publication Data

US 2024/0357480 A1      Oct. 24, 2024

(51) Int. Cl.
*H04W 48/18*      (2009.01)
*H04W 28/02*      (2009.01)
*H04W 48/12*      (2009.01)

(52) U.S. Cl.
CPC ....... *H04W 48/18* (2013.01); *H04W 28/0284* (2013.01); *H04W 28/0289* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 2016/0205592 A1* | 7/2016 | Koskinen .......... | H04W 28/0819 370/230 |
| 2018/0310269 A1* | 10/2018 | Mayer ............... | H04W 56/0045 |
| 2019/0082376 A1* | 3/2019 | Hong .................... | H04W 76/10 |
| 2022/0353798 A1* | 11/2022 | Yang .................... | H04W 48/16 |

* cited by examiner

*Primary Examiner* — Hong S Cho

(57)      ABSTRACT

A method, a network device, and a non-transitory computer-readable storage medium are described in relation to an cellular preference service. The cellular preference service may include a network-side service that manages cellular access preference relative to non-cellular access offload for end devices. The cellular preference service may transmit information to the end devices that may be used to override or direct use of cellular access when non-cellular access is available. The cellular preference service may include an end device side service that manages cellular access preference relative to non-cellular access offload based on the information received from the network.

20 Claims, 10 Drawing Sheets

215

200

NON-CELLULAR
ACCESS DEVICE
107-2

A TAC
207

END
DEVICE
130

CELLULAR
ACCESS
DEVICE
107-1

STORE A TAC
ASSOCIATED WITH
CELL PREFERENCE
OVER NON-CELL
205

COMPARE STORED
AND RECEIVED TACS
AND DETERMINE
RADIO ACCESS
210

215

NON-CELLULAR ACCESS DEVICE
107-2

DUMMY PLMN AND/OR DUMMY TAC
225

CELLULAR ACCESS DEVICE
107-1

END DEVICE
130

STORE DUMMY PLMN ID AND/OR DUMMY TAC ASSOCIATED WITH CELL PREFERENCE OVER NON-CELL
220

COMPARE STORED AND RECEIVED DUMMY PLMN IDS AND/OR DUMMY TACS AND DETERMINE RADIO ACCESS
227

NON-CELLULAR
ACCESS DEVICE
107-2

SIB OR IE THAT
GOVERN THE CELL
PREFERENCE SERVICE
235

END
DEVICE
130

CELLULAR
ACCESS
DEVICE
107-1

STORE, UPDATE, AND/
OR USE THE
INFORMATION 237 TO
PROVIDE THE CELL
PREFERENCE SERVICE

230

240

285

400

IDENTIFY A TRIGGER FOR CELLULAR PREFERENCE OVER NON-CELLULAR
ACCESS
405

GENERATE A MESSAGE THAT INCLUDES CELLULAR PREFERENCE
INFORMATION
410

TRANSMIT THE MESSAGE TO AN END DEVICE
415

UPDATE?
420
NO          YES

GENERATE A MESSAGE THAT INCLUDES CELLULAR PREFERENCE
INFORMATION
425

TRANSMIT THE MESSAGE TO THE END DEVICE
430

500

| RECEIVE AND STORE CELLULAR PREFERENCE INFORMATION 505 |
|---|

| DETERMINE WHETHER CELLULAR OR NON-CELLULAR ACCESS IS TO BE USED BASED ON THE CELLULAR PREFERENCE INFORMATION 510 |
|---|

| CONNECT TO CELLULAR ACCESS DEVICE 515 | CONNECT TO NON-CELLULAR ACCESS DEVICE 525 |
|---|---|
| APPLY APPLICABLE TIMER 520 | APPLY APPLICABLE TIMER 530 |

METHOD AND SYSTEM FOR CELLULAR PREFERENCE

BACKGROUND

Development and design of networks present certain challenges from a network-side perspective and an end device perspective. For example, Next Generation (NG) wireless networks, such as Fifth Generation New Radio (5G NR) networks are being deployed and are under development. Additionally, end devices may use other wireless technologies to access various application services.

DETAILED DESCRIPTION

Figure 1:
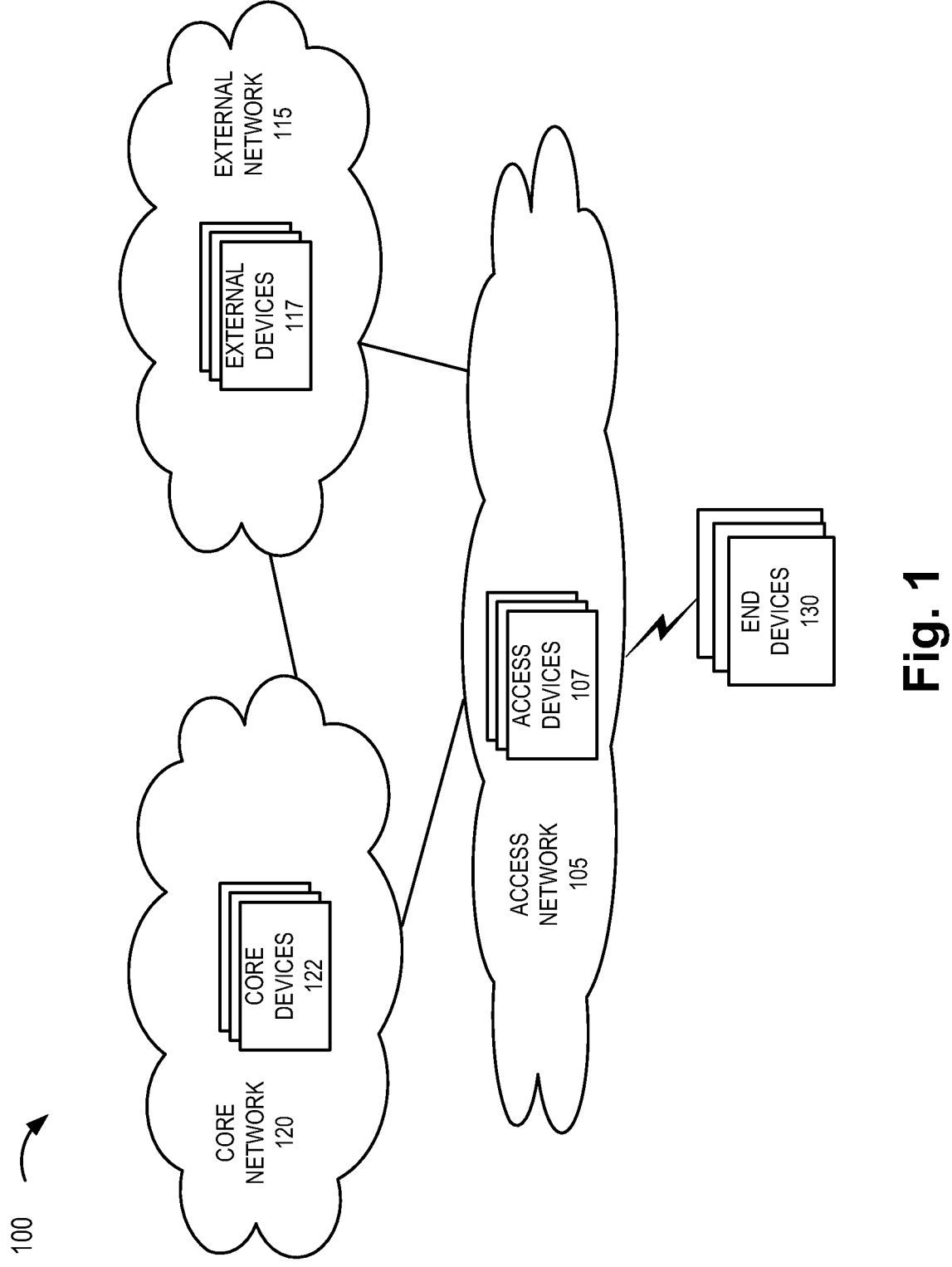
FIG. 1 is a diagram illustrating an exemplary environment in which an exemplary embodiment of an cellular preference service may be implemented.

The following detailed description refers to the accompanying drawings. The same reference numbers in different drawings may identify the same or similar elements. Also, the following detailed description does not limit the invention.

The wireless communication capabilities of end devices may vary. For example, some end devices may be configured to access and use 5G wireless networks as well as legacy wireless networks such as Fourth Generation (4G) or Long Term Evolution (LTE) networks. Additionally, the end devices may be configured to access and use other wireless technologies, such as Wi-Fi, Bluetooth, and the like. Network operators and/or other entities may configure the end devices to select a wireless technology over another wireless technology when two or more wireless technologies are available for access and use. For example, an end device may select Wi-Fi over cellular service (e.g., Wi-Fi offloading). Wi-Fi offloading may minimize congestion in the radio access network (RAN) of the cellular network and/or may provide suitable wireless access given a particular context, such as in a venue situation where there may be a large number of end users/end devices aggregated in given area, for example. According to various implementations, a Wi-Fi or other type of non-cellular preference may be based on a user preference, the location of the end device (e.g., tracking area code (TAC), etc.), and/or another type of configuration (e.g., hard-wired, etc.).

Currently, there is no standard (e.g., promulgated by Third Generation Partnership Project (3GPP), 3GPP2, International Telecommunication Union (ITU), European Telecommunications Standards Institute (ETSI), Global System for Mobile (GSM) Association (GSMA), and the like) to communicate to an end device that cellular service is preferred over another wireless technology (e.g., Wi-Fi). Additionally, a Wi-Fi network is not configured to redirect an end device to a cellular network.

According to exemplary embodiments, a cellular preference service is described herein. According to an exemplary embodiment, the cellular preference service may configure an end device to select cellular access over non-cellular access (e.g., Wi-Fi, WiMax, non-terrestrial (e.g., satellite or the like), wireless local area network (WLAN), or the like) in some situations, based on, for example TAC information. According to an exemplary embodiment, the cellular access preference may be implemented for context-specific situations. For example, the end device may select cellular access over Wi-Fi where venue-RAN devices, such as a venue evolved Node B (eNB) or a venue next generation Node B (gNB) are available for access and use by the end device. According to an exemplary embodiment, the end device may store the TAC information. The venue-RAN device may transmit (e.g., broadcast, multicast, unicast, etc.) a TAC, which can be used by the end device in relation to the TAC information stored by the end device, as described herein, to provide the cellular preference service. For example, the end device may compare and determine when there is a match between the stored TAC and the received TAC information.

According to another exemplary embodiment, the cellular preference service may include the use of a dummy (e.g., invalid) public land mobile network (PLMN) identifier or a combination of a dummy PLMN identifier and a dummy (e.g., invalid) TAC. For example, the dummy PLMN identifier and/or dummy TAC may be used to indicate the cellular preference over non-cellular access. According to an exemplary embodiment, the end device may store a pre-defined dummy PLMN identifier and/or a pre-defined dummy TAC. A RAN device may transmit (e.g., broadcast, multicast, unicast, etc.) the dummy PLMN identifier and/or the dummy TAC, which may be received and used by the end device to provide the cellular preference service. For example, the end device may compare and determine when there is a match between the stored and received dummy PLMN identifiers and/or dummy TACs.

According to yet another exemplary embodiment, the cellular preference service may include the use of an information block message and/or an information element (IE) (e.g., added to an existing, standard, or proprietary information block message) transmitted from the RAN device to the end device. For example, the RAN device may transmit a system information block (SIB) message and/or an information element (e.g., included in an existing, standard, or proprietary SIB message) that indicate a cellular preference over non-cellular access. The information block message and/or the IE may indicate other types of information. For example, the information block message and/or the IE may indicate Wi-Fi offload restrictions, Wi-Fi neighbor information, and/or minimum signal strength and/or quality for Wi-Fi offload.

According to an exemplary embodiment, the cellular preference service may provide mechanisms to avoid congestion in a RAN stemming from the cellular preference, as described herein. For example, the cellular preference service may include a configuration that may direct the end device to non-cellular access via access barring, Radio Resource Control (RRC) messaging (e.g., cell reselection priority, invalid/dummy channel numbers, timer values, etc.), as described herein.

In view of the foregoing, the cellular preference service may enable flexible cellular preference and override mechanisms that can manage end devices and the use of cellular and non-cellular access services. The cellular preference service may provide cost-effective solutions that can manage network resources and wireless access by end devices in configurable contexts.

FIG. 1 is a diagram illustrating an exemplary environment 100 in which an exemplary embodiment of a cellular preference service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the cellular preference service may use at least one of these planes of communication.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved Long Term Evolution (eLTE) eNB, an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access customer premise equipment (FWA CPE), etc.) that provides a wireless access service. As such, access network 105 may include access devices 107 that constitute cellular access devices and non-cellular access devices, as described herein. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector/zone, carrier, and/or other configurable level. For example, the sub-sector/zone level may include multiple divisions of a geographic area of a sector relative to access device 107. By way of further example, the sector may be divided based on proximity to the antenna of access device 107 (e.g., near, mid, far) and/or another criterion. According to another example, radio coverage of a location may be divided based on a Military Grid Reference System (MGRS) or another type of grid system to produce geo-bins. The size and/or shape of each geo-bin may be configurable. The size and/or the shape of a geo-bin may depend on the types of access device 107 (e.g., eNB versus gNB), attributes of access device 107 (e.g., antenna configuration, radio frequency band of beam, etc.), and/or other factors (e.g., terrain of the radio covered locale).

According to an exemplary embodiment, at least some of access devices 107 may be implemented as a virtual network device. Access device 107 may be virtualized according to various virtualization technologies, which may include a virtual machine (VM), a container, a pod, a host device, a hypervisor, an operating system, and/or another type of virtualization element, layer, or component. The virtualization technology may also be implemented based on other known (e.g., proprietary, hybrid, etc.) network function virtualization (NFV) or future generation virtualization.

According to an exemplary embodiment, at least some of access devices 107 may include logic of an exemplary embodiment of a network-side cellular preference service, as described herein. According to an exemplary embodiment, the network-side cellular preference service may include access device 107 transmitting a tracking area code (TAC), which indicates a TAC where cellular over non-cellular access (e.g., Wi-Fi) is preferred, to end device 130, as described herein. According to another exemplary embodiment, the network-side cellular preference service may include access device 107 transmitting a dummy public land mobile network (PLMN) identifier (ID) or a dummy PLMN ID and a dummy TAC, which may indicate a PLMN ID or a PLMN ID and a TAC where cellular over non-cellular access (e.g., Wi-Fi) is preferred, to end device 130, as described herein. According to yet another exemplary embodiment, the network-side cellular preference service may include access device 107 transmitting a SIB message or an information element (IE), which may indicate cellular over non-cellular access (e.g., Wi-Fi) is preferred, to end device 130, as described herein.

According to still another exemplary embodiment, the network-side cellular preference service may include access device 107 transmitting a SIB message or an IE, which may indicate restrictive and/or managerial radio access parameters and values. For example, the SIB message or the IE may restrict end device 130 when offload to non-cellular access (e.g., Wi-Fi, etc.) is permitted, as described herein. Additionally, or alternatively, the SIB message or the IE may indicate a neighbor list of non-cellular information (e.g., Wi-Fi neighbor list, service set identifier (SSID), frequencies, frequency bands, and/or the like) and/or other types of information (e.g., minimal signal strength and/or signal quality for offload from cellular access/service, Wi-Fi offload, and the like), as described herein.

According to an exemplary embodiment, the network-side cellular preference service may manage cellular access and use by end devices 130 based on the state of the RAN. For example, when cellular preference is invoked, there is the possibility that the RAN (e.g., a cellular network, cellular RAN devices, etc.) may become congested given that (a preference to) offload to a non-cellular network has been overridden. According to an exemplary embodiment, access device 107 may use an access barring factor for mobile originating (MO) data to bar access by end device 130 despite a cellular preference. According to an exemplary embodiment, the network-side cellular preference service may include a configurable threshold barring value. For example, when the MO data access barring factor is equal to or greater than the threshold barring value (e.g., x %), end device 130 may select a random value between a numerical range (e.g., 0 to 1, etc.). If the random value is equal to or greater than a threshold random value, end device 130 may connect to a non-cellular access device 107 even though the network has signaled that and/or end device 130 is configured for cellular preference over non-cellular preference. However, if the random value is less than the threshold random value, end device 130 may connect to a cellular access device 107. A decision regarding radio access based on the random value may be valid for time y, where y may be a randomized value. According to various exemplary embodiments, the threshold barring value, the threshold random value, and/or the validity timer value may be programmable values, may be stored by end device 130, and may be updated via an operator reserved PCO or another suitable communication approach, for example.

According to an exemplary embodiment, the network-side cellular preference service may manage cellular access and use by end devices 130 based on the state of the RAN. For example, when cellular preference is invoked, there is the possibility that the RAN (e.g., a cellular network, cellular RAN devices, etc.) may become congested given that (a preference to) offload to a non-cellular network has been overridden. According to an exemplary embodiment, access device 107 may use radio resource control (RRC) messaging to direct end device 130 to non-cellular radio access even though cellular preference is configured. According to various exemplary implementations, the RRC message may be an RRC Connection Release message, an RRC Release message, or another type of RRC message. According to an exemplary embodiment, the RRC message may include an IE that directs end device 130 to non-cellular access. According to another exemplary embodiment, end device 130 may be instructed based on deprioritizing cellular access. For example, all NR and/or LTE carriers indicated in the RRC message may be assigned the lowest possible cell selection/reselection priority value, a RAT (e.g., LTE, NR, etc.) is totally deprioritized, and/or similar deprioritizing approach. According to yet another exemplary embodiment, the RRC message may include data indicating redirection to an invalid and/or dummy radio value (e.g., a dummy LTE channel number, an invalid NR channel number).

According to various exemplary embodiments, the redirection may be subject to time period. For example, the RRC message may include a timer value (e.g., included in an IE). According to another example, for the deprioritizing approach, end device 130 may use a t320 timer value or a pre-defined timer value stored. According to yet another example, for the invalid or dummy value approach, end device 130 may store a predefined dummy/invalid value which may be compared to the data of the RRC message. When end device 130 determines that there is a match, end device 130 may access and use a non-cellular access device even though cellular preference has been activated or configured. According to an exemplary embodiment, the time or timer values and/or the dummy/invalid value may be programmable, stored on end device 130, and updated via operator reserved PCO message or another type of message, as described herein.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS)

network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, at least some of end devices 130 include logic of an exemplary embodiment of an end device-side cellular preference service, as described herein. For example, according to an exemplary embodiment, during an offload (e.g., Wi-Fi offload or another non-cellular radio access offload), end device 130 may maintain an attachment to a cellular RAN device (e.g., an eNB, a gNB, an eLTE eNB, etc.), which may depend on context (e.g., SA mode, NSA mode, availability of RAN devices, etc.). In this way, end device 130 may have a cellular connection, which is "warm", if a prospective hand-up from the offload to a cellular connection is needed or desired.

According to an exemplary embodiment, as described herein, end device 130 may store and manage a TAC, a dummy PLMN ID, a dummy TAC, restriction information, managerial parameters and values, and/or another type of cellular preference service information, which may be used for comparison and determinations regarding cellular preference (e.g., over non-cellular access and use associated with an offload) and/or other analytics or procedures associated with the end device-side cellular preference service. According to an exemplary embodiment, the network-side cellular preference service may manage (e.g., update, replace, override default and/or last stored data, etc.) cellular preference information via operator reserved Protocol Configuration Options (PCO). For example, as a part of end device 130 establishing a connection with external network 115 (e.g., an IMS network, the Internet, a data network, a PDN connection, a PDU connection, etc.), the cellular preference service information stored at or to be stored at may be updated or provided to end device 130 via an operator reserved PCO container. By way of further example, an updated TAC or an updated dummy PLMN ID may be communicated to end device 130. This procedure may be implemented for any and all end devices, select end devices 130, and/or another group or set of end devices 130. According to other examples, the cellular preference information may be managed using other communication approaches via control plane signaling, for example.

According to an exemplary embodiment, the cellular preference service for end device 130 may depend on the type of subscription associated with end device 130 and/or a user. For example, in a multi-tiered subscription framework, end device 130 or the user of a threshold tier of subscription may be afforded the cellular preference service. In this way, such end device 130 and/or user may be afforded a higher grade cellular connection (e.g., relative to a non-cellular connection) when signaled or configured by the network and override any non-cellular offload (e.g., a Wi-Fi offload, etc.). According to an exemplary embodiment, the cellular preference service may enable the network to block non-cellular access, offload, and/or the like based on the user's subscription information. According to another exemplary embodiment, the cellular preference service may provide that the network transmit reject messages that may prevent end device 130 from accessing and using a non-cellular connection. For example, the network may transmit Wi-Fi authentication reject messages with proprietary or RFC-based error codes that may inform end device 130 with a pre-defined waiting time for a retry.

Figure 2A:
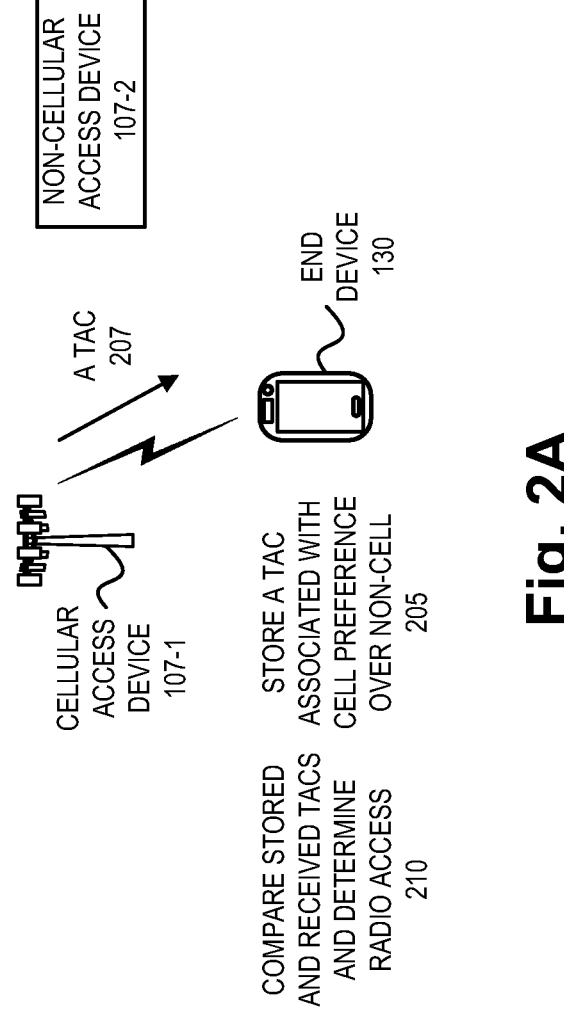
FIG. 2A is a diagram illustrating an exemplary environment in which an exemplary process of an exemplary embodiment of the cellular preference service may be implemented.

FIG. 2A is a diagram illustrating an exemplary process 200 in which an exemplary embodiment of the cellular preference service may be implemented. As illustrated, end device 130 may store a TAC, which may be correlated with data indicating a cellular preference over non-cellular access and use 205. Cellular access device 107-1 may transmit a TAC 207 to end device 130. End device 130 may compare the stored TAC with the received TAC and determine radio access 210. For example, end device 130 may use cellular radio access of cellular access device 107-1 over non-cellular radio access of non-cellular access device 107-2, as described herein, when the stored TAC matches the received TAC. When the stored TAC does not match the received TAC, end device 130 may operate without cellular preference (e.g., non-cellular offload may be used).

Figure 2B:
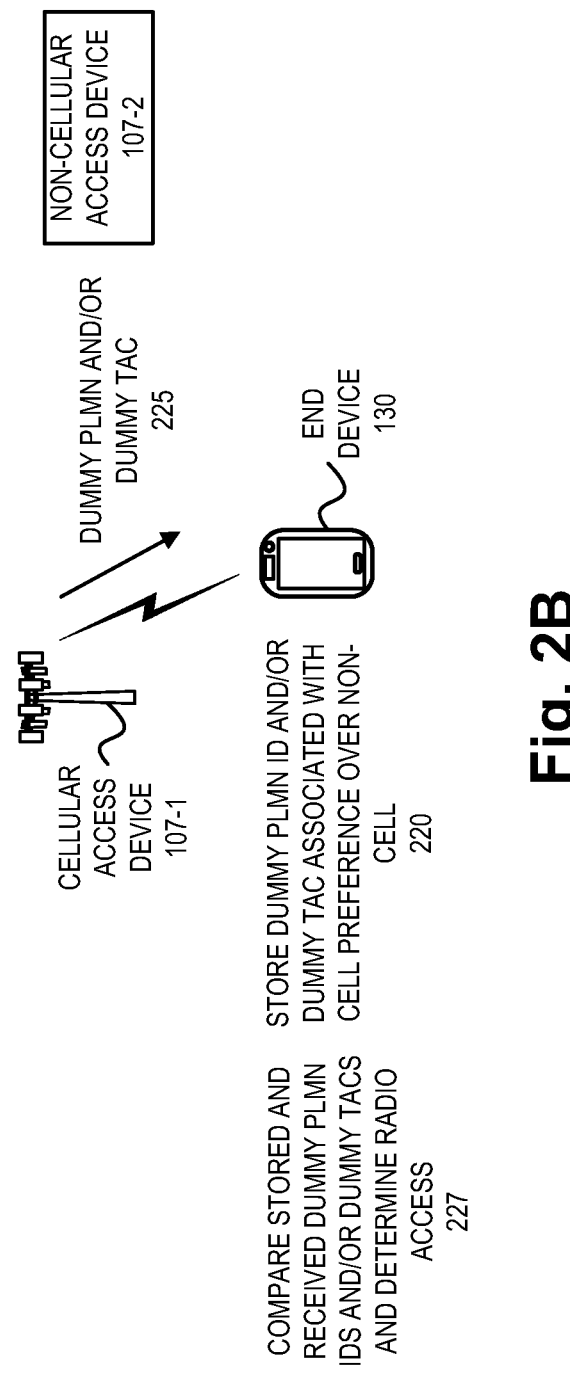
FIG. 2B is a diagram illustrating another exemplary process in which an exemplary embodiment of the cellular preference service may be implemented.

FIG. 2B is a diagram illustrating an exemplary process 215 in which an exemplary embodiment of the cellular preference service may be implemented. As illustrated, end device 130 may store a dummy PLMN identifier and/or dummy a dummy TAC, which may be correlated with data indicating a cellular preference over non-cellular access and use 220. Cellular access device 107-1 may transmit a dummy PLMN identifier and/or a dummy TAC 225 to end device 130. End device 130 may compare the stored dummy PLMN identifier and/or dummy TAC with the received dummy PLMN identifier and/or dummy TAC and determine radio access 227. For example, end device 130 may use cellular radio access of cellular access device 107-1 over non-cellular radio access of non-cellular access device 107-2, as described herein, when the stored dummy PLMN identifier and/or dummy TAC matches the received dummy PLMN identifier and/or dummy TAC. When the stored dummy PLMN identifier and/or dummy TAC does not match the received dummy PLMN identifier and/or dummy TAC, end device 130 may operate without cellular preference (e.g., non-cellular offload may be used).

Figure 2C:
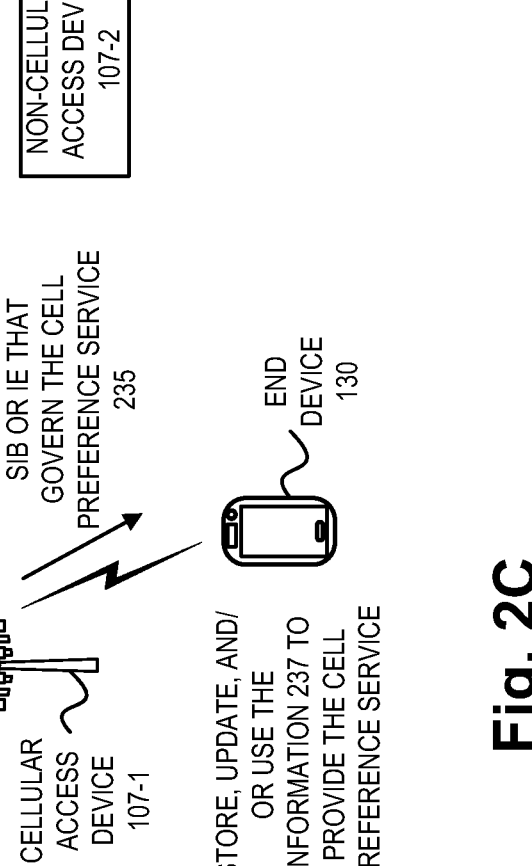
FIG. 2C is a diagram illustrating yet another exemplary process in which an exemplary embodiment of the cellular preference service may be implemented.

FIG. 2C is a diagram illustrating an exemplary process 230 in which an exemplary embodiment of the cellular preference service may be implemented. As illustrated, cellular access device 107-1 may transmit a SIB or an IE that may govern the cellular preference service 235, as described herein. For example, the SIB or the IE may indicate non-cellular offload restrictions (e.g., data only, IMS only, both data and IMS allowed, etc.), non-cellular access information (e.g., SSID, frequencies or bands, etc.), minimum signal strength and/or signal quality for non-cellular offload, and/or other parameters and values, as described herein, which pertain to non-cellular access of non-cellular access device 107-2. End device 130 may store, update, and/or use this information 237 (e.g., the SIB or the IE information) to provide the end device-side cellular preference service, as described herein.

According to some exemplary embodiments, referring to FIGS. 2A-2C, cellular access device 107-1 may transmit cellular preference information (e.g., TAC, dummy PLMN ID, dummy TAC, cellular preference management/restriction data, etc.) via other communication methods. For example, cellular access device 107-1 may include this information in an RRC message. For example, an RRC Connection Setup message, an RRC Connection Reconfiguration message, an RRC Connection Release message, or another type of RRC message or non-RRC message may include cellular preference information, as described herein.

Figure 2D:
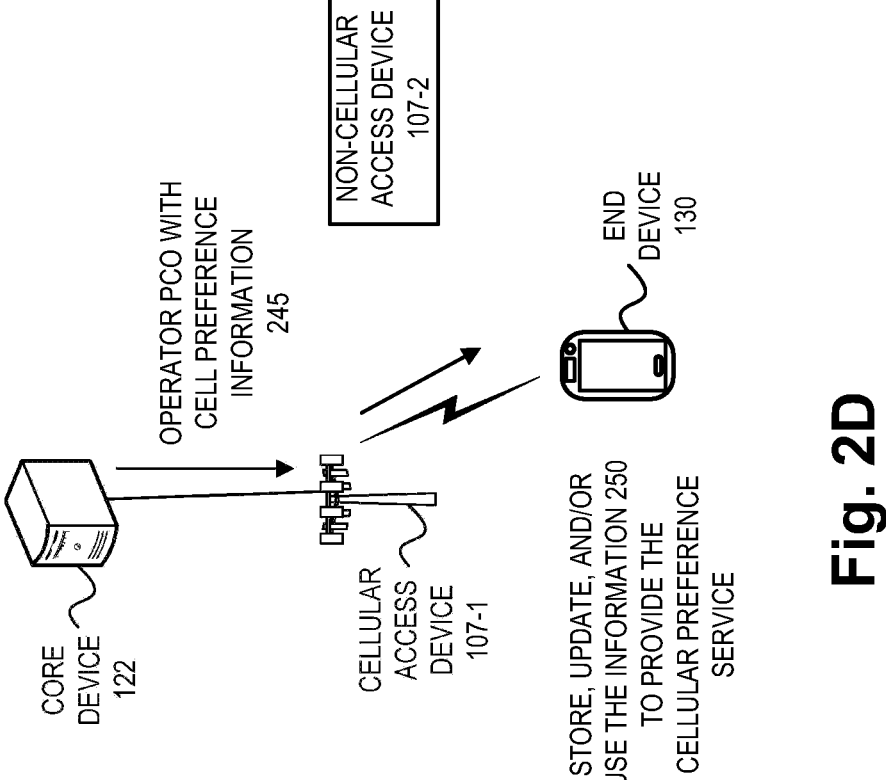
FIG. 2D is a diagram illustrating still another exemplary process in which an exemplary embodiment of the cellular preference service may be implemented.
Figure 2D:

FIG. 2D is a diagram illustrating an exemplary process 240 in which an exemplary embodiment of the cellular preference service may be implemented. As illustrated, core device 122 may transmit an operator PCO container or other type of data unit, which includes cellular preference information 245, to cellular access device 107-1. As an example, core device 122 may be implemented as an MME or an AMF. As previously described, the network may manage and/or update the cellular preference information 245 (e.g., TAC, dummy PLMN ID, dummy TAC, cellular preference management/restriction data, etc.) to be stored, updated, and/or used by end device 130. Cellular access device 107-1 may further transmit the cellular preference information 245 to end device 130. End device 130 may store, update, and use the cellular preference information 250 to provide the end device-side cellular preference service, as described herein.

Figure 2E:
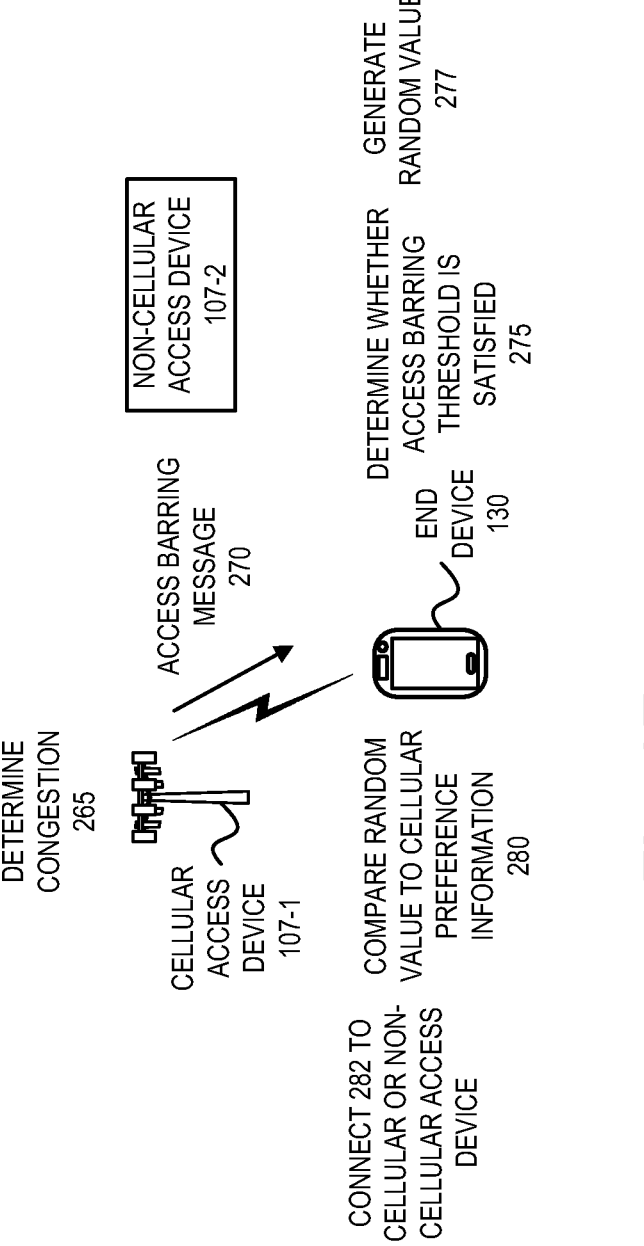
FIG. 2E is a diagram illustrating another exemplary process in which an exemplary embodiment of the cellular preference service may be implemented.

FIG. 2E is a diagram illustrating an exemplary process 260 in which an exemplary embodiment of the cellular preference service may be implemented. As illustrated, cellular access device 107-1 may determine congestion 265. For example, a gNB or an eNB may determine congestion at the gNB or the eNB. According to another example, a RIC device or another type of RAN device or core device 122 may determine a level of congestion which may trigger access barring measures. In response, cellular access device 107-1 may generate and transmit an access barring message 270. For example, the access barring message may include an IE or another type of data instance that indicates an access class (AC) barring parameter and value for MO data. By way of example, the AC barring parameter and value may include a barring factor and value. The AC barring parameter and value may also include a threshold barring factor and value, a threshold random value, and/or a time value, as described herein. Alternatively, end device 130 may have any of these parameters and values already stored.

Based on receipt of the access barring message, end device 130 may determine whether an access barring threshold is satisfied 275. For example, end device 130 may compare the received barring factor/value to a threshold barring factor/value. The threshold barring factor/value may be stored by end device 130 as a part of the cellular preference information. When the received barring factor satisfies the threshold barring factor/value, end device 130 may generate or select a random value 277. The generated or selected random value may be within a predefined numerical range of possible values. Otherwise, when the received barring factor/value does not satisfy the threshold barring factor/value, end device 130 may end process 260. According to other exemplary embodiments, the results of the comparison to the threshold barring factor/value could yield the opposite execution of operations (e.g., received barring factor satisfies the threshold barring factor, process 260 ends, etc.).

In response to the generating or selecting the random value, end device 130 may compare the random value to cellular preference information 280. For example, cellular preference information stored by end device 130 may include a threshold random value. Based on a result of the comparison, end device 130 may connect to/maintain connection with 282 cellular access device 107-1 or connect 282 to non-cellular access device 107-2. For example, when the generated or selected random value satisfies the threshold random value, end device 130 may connect to non-cellular access device 107-2 even though end device 130 may be configured for or previously received instruction or activation of cellular preference (e.g., connect to cellular access device 107-1). Otherwise, when the generated or selected random value does not satisfy the threshold random value, end device 130 may connect to or maintain a connection with cellular access device 107-1 or some other suitable cellular access device (not illustrated). As previously described, the non-cellular override of the cellular preference may be for a prescribed period of time (e.g., a randomized time period, a non-random time period, etc.). According to other exemplary embodiments, the results of the comparison to the threshold random value could yield the opposite execution of operations, as described herein.

According to an exemplary embodiment, the AC barring parameters and values, as well as other types of cellular preference information are programmable and may be managed (e.g., updated, configured, etc.) via various communication messages (e.g., operator reserved PCO message, an RRC message, a non-RRC message, a control plane message, etc.), as described herein.

Figure 2F:
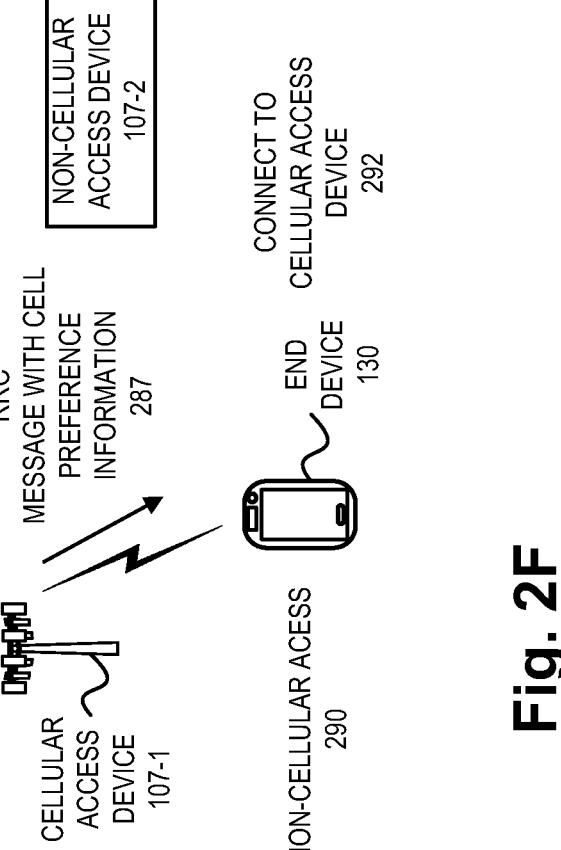
FIG. 2F is a diagram illustrating yet another exemplary process in which an exemplary embodiment of the cellular preference service may be implemented.

FIG. 2F is a diagram illustrating an exemplary process 285 in which an exemplary embodiment of the cellular preference service may be implemented. As illustrated, similar to process 260 in which congestion may trigger the network to direct end device 130 to use non-cellular access even though cellular access has been previously activated, cellular access device 107-1 may generate and transmit an RRC message with cell preference information 287 to end device 130. According to an exemplary embodiment, an RRC Connection Release or an RRC Release message may include an IE that may direct end device 130 to non-cellular access (e.g., Wi-Fi, etc.). In response to reading the IE, end device 130 may use non-cellular access 290. For example, end device 130 may connect to non-cellular access device 107-2. As previously described, a timer value may be included in the IE. According to another exemplary embodiment, the RRC message may include an IE that deprioritizes a RAT and/or frequency information (e.g., carrier, frequency band, channel, etc.) for cell selection/reselection. In this way, cellular access is deprioritized and non-cellular access may be used by end device 130. In response to reading the IE and performing a cell selection or reselection procedure, end device 130 may use non-cellular access 290. As previously described, a timer value may be included in the IE, a predefined timer value may already be stored by end device 130, or a timer associated with cell selection/reselection (e.g., t320 timer) may be used. According to yet another exemplary embodiment, the RRC message may include an IE that includes an invalid or dummy channel number (e.g., dummy or invalid LTE channel number, dummy or invalid frequency band, dummy or invalid carrier, etc.; dummy or invalid NR channel number, frequency band, carrier, etc., or another dummy or invalid RAT channel number, frequency band, carrier, etc.). As previously described, a predefined invalid or dummy channel number may be stored by end device 130 for comparison to the received invalid or dummy channel number. In response to reading the IE, end device 130 may determine a result of the comparison (e.g., match or no match). When there is a match, end device 130 may use non-cellular access 290. When there is not a match, end device 130 may connect to or maintain a connection with a cellular access device at 292 (e.g., cellular access device 107-1 depicted in FIG. 2F).

FIGS. 2A-2F illustrate exemplary processes of the cellular preference service according to an exemplary scenario, however, according to other exemplary embodiments, the process may include additional, fewer, and/or different operations than those depicted and described in relation to FIGS. 2A-2F.

Figure 3:
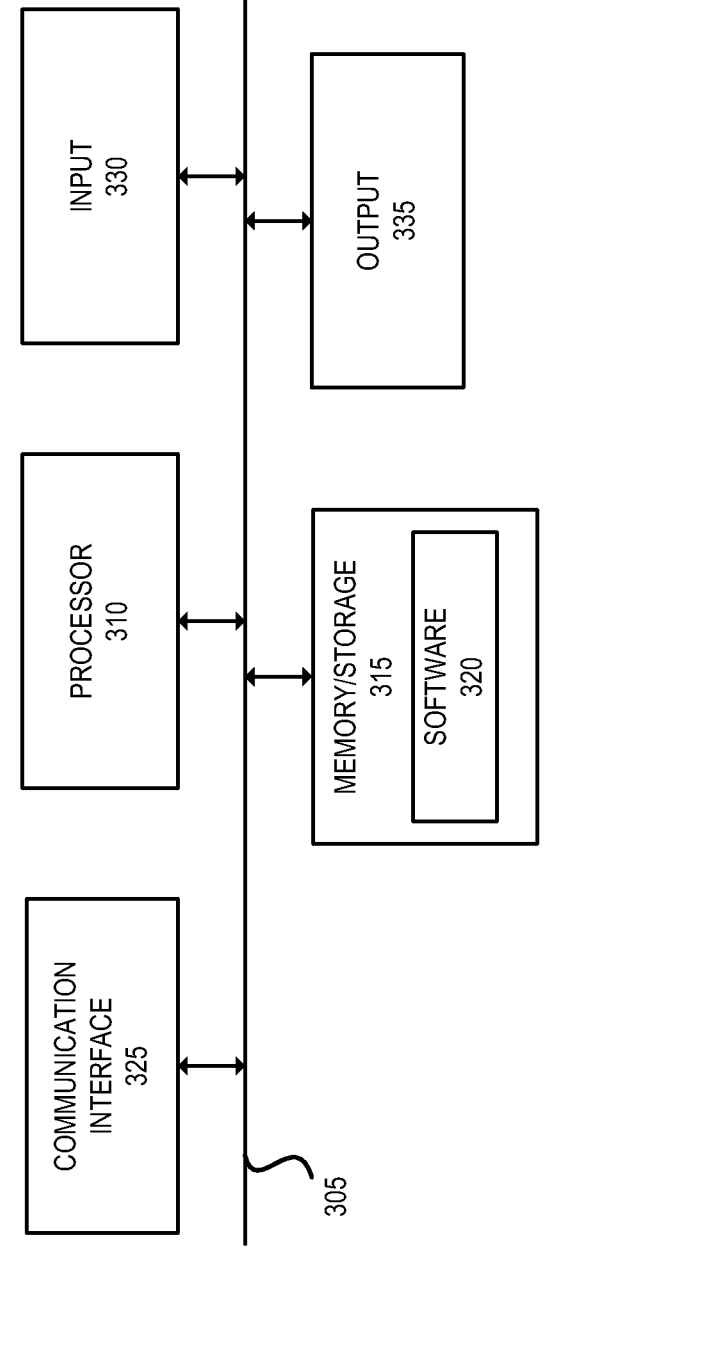
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to end device 130, software 320 may include an application that, when executed by processor 310, provides a function and/or a process of the end device-side service of the cellular preference service, as described herein. Additionally, for example, with reference to access device 107 and core device 122, software 320 may include an application that, when executed by processor 310, provides a function and/or a process of the network-side service of the cellular preference service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/ storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 may be configured to performs a function or a process described herein based on the execution of hardware (processor 310, etc.).

Figure 4:
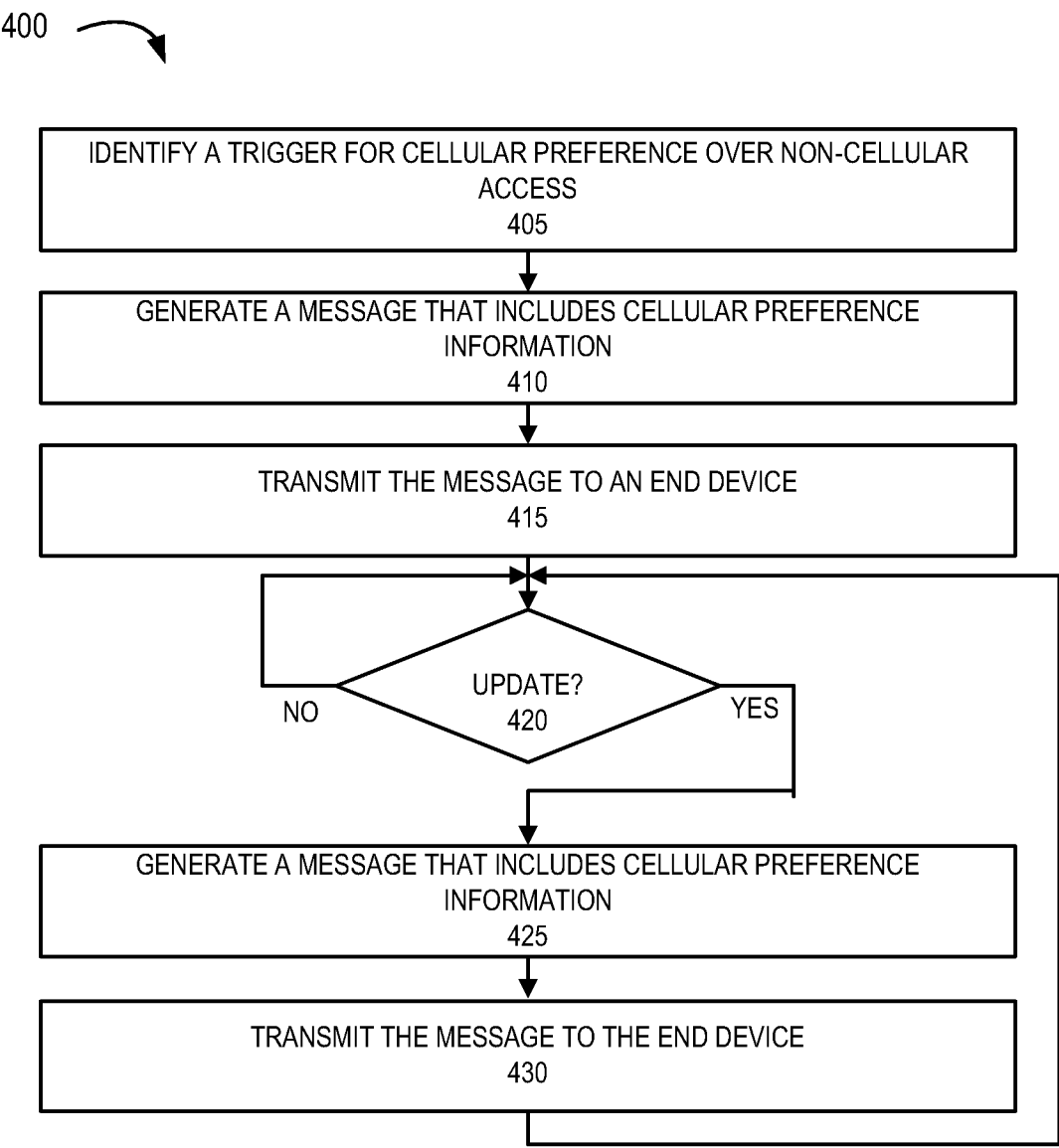
FIG. 4 is a flow diagram illustrating an exemplary process of an exemplary embodiment of the cellular preference service.

FIG. 4 is a flow diagram illustrating an exemplary process 400 of an exemplary embodiment of the cellular preference service. According to an exemplary embodiment, a network device (e.g., access device 107, core device 122) may perform process 400. According to an exemplary implementation, processor 310 executes software 320 to perform a step of process 400, as described herein. Alternatively, a step may be performed by execution of only hardware. For purposes of description, process 400 is described as performed by a cellular access device 107 (e.g., an eNB, a gNB, an eLTE eNB, a DU, a CU, or another suitable access device 107 that provides cellular radio access service). According to an exemplary embodiment, end device 130 may be configured with non-cellular offload or non-cellular access preference when available.

In block 405, cellular access device 107 may identify a trigger for cellular preference over non-cellular access by end device 130. For example, according to various exemplary embodiments, the trigger may relate to congestion at cellular access device 107, congestion associated with neighboring cellular access devices 107, a particular area of access network 105, and so forth.

According to another example, the trigger may relate to the wireless service area of cellular access device 107. The wireless service area may include an indoor location, an outdoor location, a public location, a private location, a place of business, and so forth. For example, cellular access device 107 may provide radio access for a venue where non-cellular access may also be available.

According to various exemplary embodiments, the venue may include an entertainment location (e.g., a movie theater, a museum, a park, a restaurant, a sports stadium, an arena, etc.), a retail location (e.g., a shopping mall, a retail store, a grocery store, etc.), a transportation location (e.g., a train station, an airport, a bus station, etc.), a business location (e.g., a bank, a hotel, etc.), a parking garage, a hospital, and/or another type of venue.

Based on the wireless service area, the trigger may relate to the occurrence of an event at the venue (e.g., a sporting event occurring at the sports stadium). According to another example, the trigger may relate to the number of non-cellular connections, the number of requests for non-cellular connections over a time period, the type of application service sessions via the non-cellular connections (e.g., low latency, high throughput, etc.), and/or other criteria that may pertain to use and/or non-use of cellular access device 107 (e.g., the lack of cellular connections at cellular access device 107, a low connection request rate, etc.) or conversely use of non-cellular access devices. Cellular access device 107 may be configured with a threshold value to compare to the trigger information. Cellular access device 107 may determine when a trigger has been satisfied. According to some exemplary implementations, cellular access device 107 may obtain trigger information from a non-cellular access device (e.g., cellular access device 107 and the non-cellular access device may share the same network operator), or from another network device (e.g., core device 122, external device 117, etc.) which may obtain the trigger information for particular cellular access devices 107 that provide wireless service in a venue-based location and non-cellular access is available.

In block 410, cellular access device 107 may generate a message that includes cellular preference information. For example, as previously described, the message may be implemented as a SIB message, an RRC message, a non-RRC message, a control plane message, a PCO message, an IE, or another type of message. Additionally, for example, as previously described, the cellular preference information may include a TAC, a dummy TAC, a dummy PLMN ID, AC barring parameters, restriction information, managerial parameters and values, and/or other types of cellular preference information.

In block 415, cellular access device 107 may transmit the message to end device 130. For example, cellular access device 107 may broadcast, multicast, or unicast the message to one or multiple end devices 130. According to some exemplary embodiments, cellular access device 107 may select end devices 130 based on their subscription level, as previously described.

In block 420, subsequent to transmitting the message, cellular access device 107 may determine whether an update to the cellular preference information is needed. For example, cellular access device 107 may make this determination based continuously, periodically (e.g., based on fixed time period), based on a schedule, based on the occurrence of a triggering event, and/or according to another configurable criterion. When cellular access device 107 determines that the update is not needed (block 420—NO), process 400 may return to block 420. When cellular access device 107 determines that the update is needed (block 420—YES), cellular access device 107 may generate a message that includes cellular preference information (block 425). Cellular access device 107 may transmit the message to end device 130 (block 430).

FIG. 4 illustrates an exemplary process of the cellular preference service, however, according to other exemplary embodiments, the cellular preference service may perform additional operations, fewer operations, and/or different operations than those illustrated and described.

Figure 5:
FIG. 5 is a flow diagram illustrating another exemplary process of an exemplary embodiment of the cellular preference service.
Figure 5:
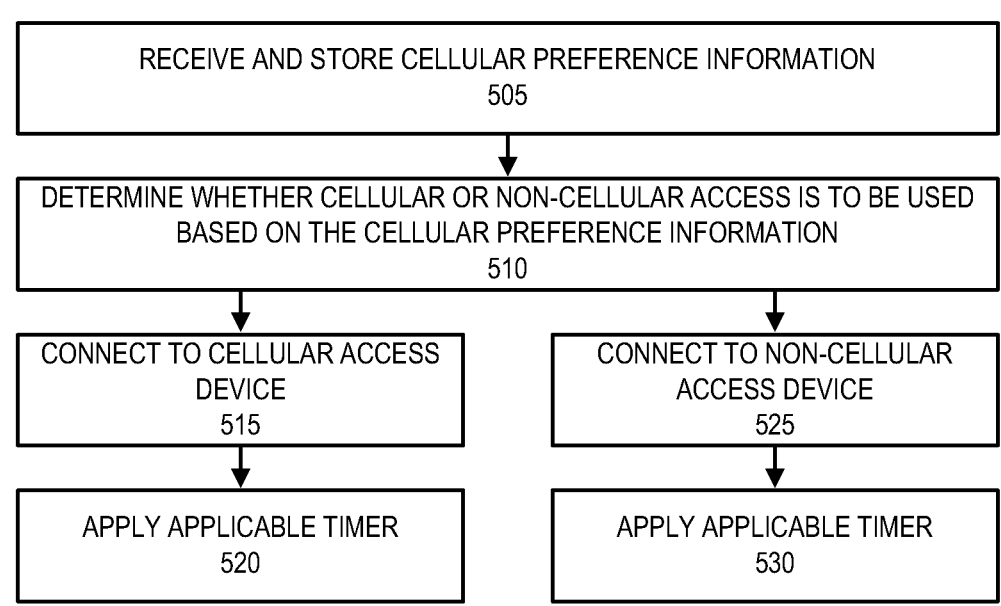

FIG. 5 is a flow diagram illustrating another exemplary process 500 of an exemplary embodiment of the cellular preference service. According to an exemplary embodiment, end device 130 may perform process 500. According to an exemplary implementation, processor 310 executes software 320 to perform a step of process 600, as described herein. Alternatively, a step may be performed by execution of only hardware.

In block 505, end device 130 may receive and store cellular preference information. For example, end device 130 may receive a message that includes cellular preference information from cellular access device 107 or core device 122 via cellular access device 107, as previously described. For example, as previously described, the message may be implemented as a SIB message, an RRC message, a non-RRC message, a control plane message, a PCO message, an IE, or another type of message. Additionally, for example, as previously described, the cellular preference information may include a TAC, a dummy TAC, a dummy PLMN ID, AC barring parameters, restriction information, managerial parameters and values, and/or other types of cellular preference information.

In block 510, end device 130 may determine whether cellular or non-cellular access is to be used based on the cellular preference information. For example, as previously described, according to various exemplary embodiments, end device 130 may compare a threshold value or predefined value to received cellular preference information. Based on the result of the comparison (e.g., match or no match), end device 130 may make a binary choice between using cellular or non-cellular access.

When cellular access is determined, in block 515, end device 130 may connect to cellular access device 107. In block 520, end device 130 may apply an applicable timer to the determination or the connection. In some cases when end device 130 is connected to non-cellular access device e107 (e.g., a Wi-Fi device, a non-terrestrial access device, etc.), end device 130 may disconnect from non-cellular access device 107.

When non-cellular access is determined, in block 525, end device 130 may connect to non-cellular access device 107. In block 530, end device 130 may apply an applicable timer to the determination or the connection.

FIG. 5 illustrates an exemplary process of the cellular preference service, however, according to other exemplary embodiments, the cellular preference service may perform additional operations, fewer operations, and/or different operations than those illustrated and described. For example, end device 130 may maintain an attachment to cellular access device 107 even when end device 130 determines to connect to non-cellular access device 107, as previously described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
identifying, by a network device of a radio access network, a triggering event;
generating, by the network device in response to the identifying, a first message that includes first information that relates to a cellular access preference over a non-cellular access for a first end device, wherein the first information includes a dummy tracking area code (TAC) or a dummy public land mobile network (PLMN) identifier; and
transmitting by the network device, the first message to the first end device.

2. The method of claim 1, wherein the first information includes a timer value that indicates a time period during which the cellular access preference applies.

3. The method of claim 1, wherein the triggering event relates to at least one of a type of application service session via a non-cellular access connection associated with a second end device and a non-cellular access device or a number of cellular connections between the network device and a third end device.

4. The method of claim 1, wherein the first message includes a system information block message or a radio resource control message.

5. The method of claim 1, further comprising:
determining, by the network device after the transmitting, network congestion;
generating, by the network device in response to the determining, a second message that includes an access barring parameter and value; and
transmitting, by the network device, the second message to the first end device.

6. The method of claim 1, further comprising:
determining, by the network device after the transmitting, network congestion;
generating, by the network device in response to the determining, a second message that includes second information that directs the first end device to use the non-cellular access; and
transmitting, by the network device, the second message to the first end device.

7. The method of claim 6, wherein the second information includes a dummy channel number or information that deprioritizes at least one of a radio access technology (RAT) or frequency information for cell selection or reselection.

8. The method of claim 1, wherein the network device is an evolved Node B (eNB), a next generation Node B (gNB), an evolved Long Term Evolution (eLTE) eNB, a distributed unit (DU) device, or a centralized unit (CU) device.

9. One or more network devices comprising:
one or more processors that are configured to:
identify a triggering event, wherein the one or more network devices are of a radio access network;
generate, in response to the identification of the triggering event, a first message that includes first information that relates to a cellular access preference over a non-cellular access for a first end device, wherein the first information includes a dummy tracking area code (TAC) or a dummy public land mobile network (PLMN) identifier; and
transmit the first message to the first end device.

10. The one or more network devices of claim 9, wherein the first information includes a timer value that indicates a time period during which the cellular access preference applies.

11. The one or more network devices of claim 9, wherein the triggering event relates to at least one of a type of application service session via a non-cellular access connection associated with a second end device and a non-cellular access device or a number of cellular connections between the network device and a third end device.

12. The one or more network devices of claim 9, wherein the first message includes a system information block message or a radio resource control message.

13. The one or more network devices of claim 9, wherein the one or more processors are further configured to:
determine, after the transmission, network congestion;
generate, in response to the determination, a second message that includes an access barring parameter and value; and
transmit the second message to the first end device.

14. The one or more network devices of claim 9, wherein the one or more processors are processor is further configured to:
determine, after the transmission, network congestion;
generate, in response to the determination, a second message that includes second information that directs the first end device to use the non-cellular access; and
transmit the second message to the first end device.

15. The one or more network devices of claim 14, wherein the second information includes a dummy channel number or information that deprioritizes at least one of a radio access technology (RAT) or frequency information for cell selection or reselection.

16. The one or more network devices of claim 9, wherein the one or more network devices are an evolved Node B (eNB), a next generation Node B (gNB), an evolved Long Term Evolution (eLTE) eNB, a distributed unit (DU) device, or a centralized unit (CU) device.

17. A non-transitory computer-readable storage medium storing instructions executable by a processor of a network device of a radio access network, wherein the instructions are configured to:

identify a triggering event;

generate, in response to the identification of the triggering event, a first message that includes first information that relates to a cellular access preference over a non-cellular access for a first end device, wherein the first information includes a dummy tracking area code (TAC) or a dummy public land mobile network (PLMN) identifier; and transmit the first message to the first end device.

18. The non-transitory computer-readable storage medium of claim 17, wherein the first information includes a timer value that indicates a time period during which the cellular access preference applies.

19. The non-transitory computer-readable storage medium of claim 17, wherein the instructions are further configured to:

determine, after the transmission, network congestion;

generate, in response to the determination, a second message that includes second information that directs the first end device to use the non-cellular access; and transmit the second message to the first end device.

20. The non-transitory computer-readable storage medium of claim 17, wherein the network device is an evolved Node B (eNB), a next generation Node B (gNB), an evolved Long Term Evolution (eLTE) eNB, a distributed unit (DU) device, or a centralized unit (CU) device.

\* \* \* \* \*